US012398876B2

(12) United States Patent
Zhu et al.

(10) Patent No.: US 12,398,876 B2
(45) Date of Patent: Aug. 26, 2025

(54) STREET LAMP HOLDER

(71) Applicant: SHANGHAI QIANLONG ENERGY-SAVING TECHNOLOGY CO., LTD., Shanghai (CN)

(72) Inventors: Zenglong Zhu, Shanghai (CN); Qingjun Wei, Shanghai (CN)

(73) Assignee: SHANGHAI QIANLONG ENERGY-SAVING TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/587,572

(22) Filed: Feb. 26, 2024

(65) Prior Publication Data

US 2024/0240782 A1 Jul. 18, 2024

Related U.S. Application Data

(63) Continuation of application No. PCT/CN2022/112934, filed on Aug. 17, 2022.

(30) Foreign Application Priority Data

Aug. 26, 2021 (CN) ......................... 202122022814.3

(51) Int. Cl.
*F21V 31/00* (2006.01)
*F21V 5/00* (2018.01)
(Continued)

(52) U.S. Cl.
CPC ............ *F21V 31/005* (2013.01); *F21V 5/007* (2013.01); *F21W 2131/103* (2013.01); *F21Y 2115/10* (2016.08)

(58) Field of Classification Search
CPC . F21V 31/005; F21V 5/007; F21W 2131/103; F21Y 2115/10; F21Y 2105/16; F21S 8/086
See application file for complete search history.

(56) References Cited

U.S. PATENT DOCUMENTS 7,753,556 B1 * 7/2010 Zhang .................. F21V 31/005 362/249.02
2011/0103051 A1 * 5/2011 Wilcox .................. F21V 25/12 362/267
(Continued)

FOREIGN PATENT DOCUMENTS

CN 201753875 U 3/2011
CN 103759197 A 4/2014
(Continued)

OTHER PUBLICATIONS

International Search Report issued on application No. PCT/CN2022/112934, dated Nov. 2, 2022 with English translation, (5p).

*Primary Examiner* — Tsion Tumebo
(74) *Attorney, Agent, or Firm* — Arch & Lake LLP

(57) ABSTRACT

A street lamp holder, including a housing, in which an accommodation cavity, a first sealing groove around the accommodation cavity and a second sealing groove located in the accommodation cavity being formed; a light source accommodated in the accommodation cavity; an optical module accommodated in the accommodation cavity and covering an outer side of the light source; and a sealing member accommodated in the first sealing groove and/or the second sealing groove; the first sealing groove is arranged around the outer side of the light source, and when the sealing member is accommodated in the first sealing groove, a sealing cavity is formed between the accommodation cavity and the housing; the second sealing groove is located between the light source and the first sealing groove, and when the sealing member is accommodated in the second sealing groove, the sealing cavity is formed between the accommodation cavity and the optical module.

10 Claims, 5 Drawing Sheets

(51) Int. Cl.
*F21W 131/103* (2006.01)
*F21Y 115/10* (2016.01)

(56) References Cited

U.S. PATENT DOCUMENTS

| | | | | |
|---|---|---|---|---|
| 2012/0087125 | A1* | 4/2012 | Liu | F21V 23/009 362/249.02 |
| 2012/0281404 | A1* | 11/2012 | Wilcox | F21V 29/763 362/244 |
| 2014/0177226 | A1* | 6/2014 | Goelz | F21V 29/70 362/294 |
| 2015/0146422 | A1* | 5/2015 | Kwak | F21V 31/005 362/235 |
| 2016/0003454 | A1* | 1/2016 | Ye | F21V 29/89 362/268 |
| 2017/0370553 | A1* | 12/2017 | Demuynck | F21V 29/74 |
| 2020/0088398 | A1* | 3/2020 | Wang | F21V 17/12 |
| 2020/0370713 | A1* | 11/2020 | Raleigh | F21V 31/005 |
| 2021/0356112 | A1* | 11/2021 | Huang | F21V 29/74 |

FOREIGN PATENT DOCUMENTS

| | | | |
|---|---|---|---|
| CN | 206257573 | U | 6/2017 |
| CN | 208735598 | U | 4/2019 |
| CN | 213746229 | U | 7/2021 |
| CN | 215929283 | U | 3/2022 |

* cited by examiner

STREET LAMP HOLDER

CROSS REFERENCE TO RELATED APPLICATIONS

This application is based upon and claims the priority of PCT patent application No. PCT/CN2022/112934 filed on Aug. 17, 2022 which claims priority to the Chinese patent application No. 202122022814.3 filed on Aug. 26, 2021, the entire contents of which are hereby incorporated by reference herein for all purposes.

TECHNICAL FIELD

The present disclosure relates to a street lamp holder, which belongs to the field of lighting equipment.

BACKGROUND

In the field of lighting, Light-emitting diode (LED) street lamps are classified into types of plastic lenses, glass lenses, glass cover plus reflectors, glass cover plus lenses, etc., and the combination of plastic lenses with glass cover plus lenses is more widely used.

SUMMARY

The present disclosure provides a street lamp holder.

The present disclosure provides a street lamp holder which may include: a housing, where an accommodation cavity, a first sealing groove arranged around the accommodation cavity, and a second sealing groove located in the accommodation cavity may be internally formed in the housing; a light source, where the light source may be accommodated in the accommodation cavity; an optical module, wherein the optical module may be also accommodated in the accommodation cavity and may cover an outer side of the light source; and a sealing member.

The sealing member may be limited and accommodated in the first sealing groove and/or the second sealing groove; the first sealing groove may be arranged around the outer side of the light source, and in a case that the sealing member is limited and accommodated in the first sealing groove, a sealing cavity may be formed between the accommodation cavity and the housing; the second sealing groove may be located between the light source and the first sealing groove, and in a case that the sealing member is limited and accommodated in the second sealing groove, the sealing cavity may be formed between the accommodation cavity and the optical module.

It is to be understood that both the foregoing general description and the following detailed description are exemplary and explanatory only and are not restrictive of the present disclosure.

DETAILED DESCRIPTION

Figure 1:
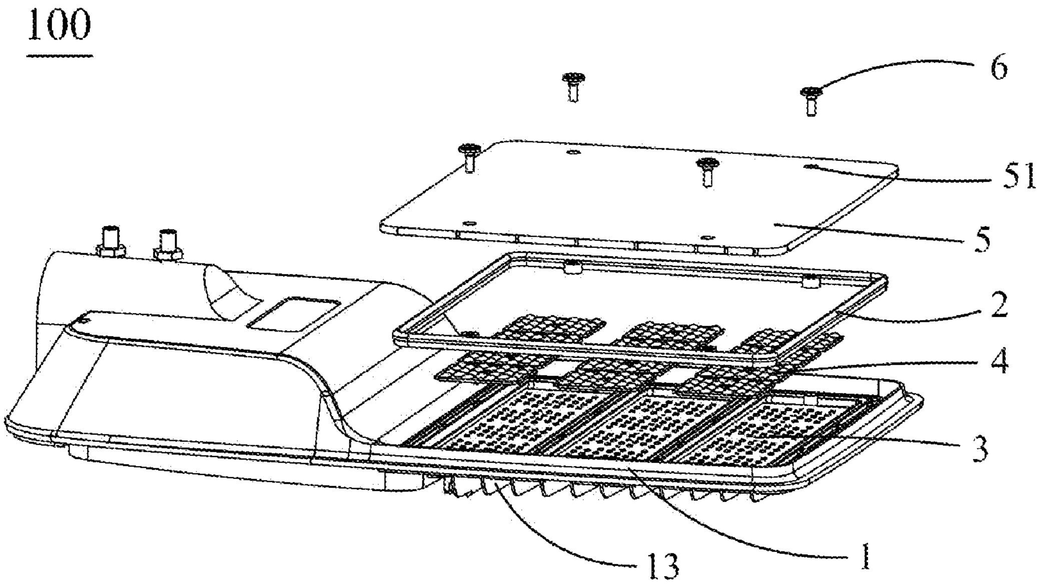
FIG. 1 is an exploded view of a street lamp holder according to a first example of the present disclosure.

In order to make the purpose, technical solution and advantages of the present disclosure clearer, the present disclosure will be described in details below in conjunction with the accompanying drawings and examples.

It is to be noted that, in order to avoid obscuring the present disclosure due to unnecessary details, only the structures and/or processing steps closely related to the technical solution of the present disclosure are shown in the drawings, and other details not really matter to the present disclosure are omitted.

It is to be noted that the terms "comprise/comprising", "include/including" or any other variations thereof are intended to cover a non-exclusive inclusion such that a process, a method, an article or an apparatus including a set of elements includes not only those elements, but also includes other elements not expressly listed, or also includes elements inherent in such process, method, article or apparatus.

Some street lamp facilities are mainly based on project bidding, which involves many customized requirements. In order to meet these customized requirements, it is necessary to develop the product functions to satisfy more application requirements.

As shown in FIG. 1 to FIG. 6, it is a first example of a street lamp holder 100 of the present disclosure, and the street lamp holder 100 is used for lighting outdoors. In this example, the street lamp holder 100 includes a housing 1, a sealing member 2, a light source 3, an optical module 4, a glass 5 and a connecting member 6; an accommodation cavity 14, a first sealing groove 11 arranged around the accommodation cavity 14 and a second sealing groove 12 located in the accommodation cavity 14 are internally formed in the housing 1; the light source 3 and the optical module 4 are both accommodated in the accommodation cavity 14 of the housing 1, and the glass 5 is connected to the housing 1 through the connecting member 6, so that the glass 5 is fixedly mounted with the housing 1, the optical module 4 covers an outer side of the light source 3, and the sealing member 2 is arranged in the first sealing groove 11, thereby realizing a sealed connection between the optical module 4 and the housing 1, and realizing waterproof and dustproof effect of the street lamp holder 100.

Figure 2:
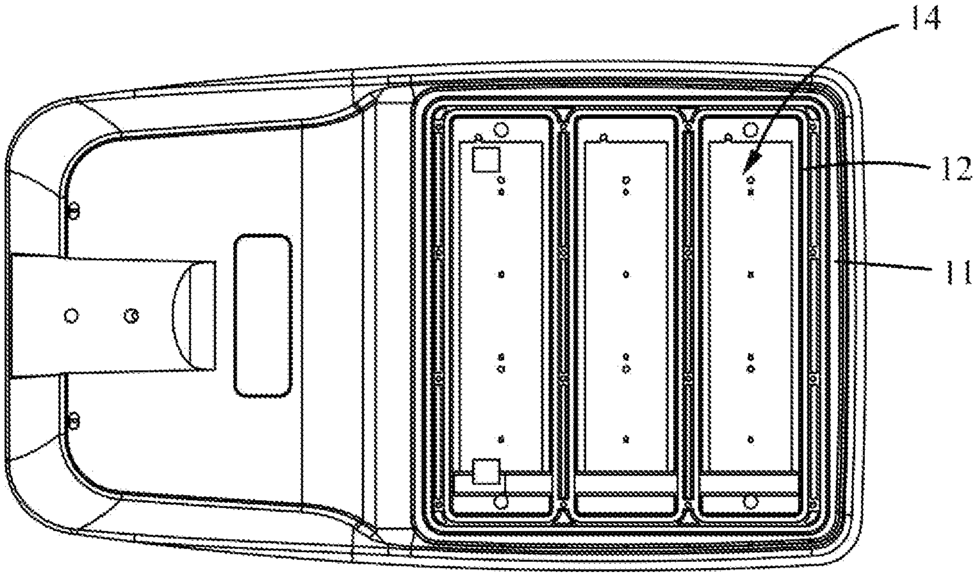
FIG. 2 is a schematic structural diagram of a housing in FIG. 1.
Figure 3:
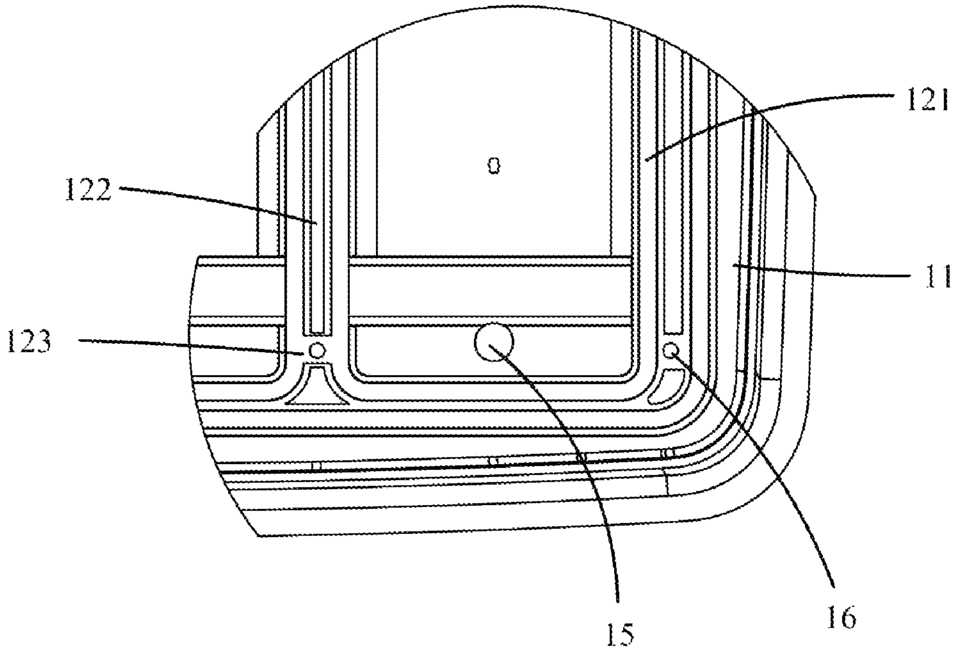
FIG. 3 is a partially enlarged view of the housing in FIG. 2.

As shown in FIG. 2 and FIG. 3, the housing 1 is provided with a heat dissipation assembly 13, which is used to dissipate heat generated by the light source 3 during a working process, so that the street lamp holder 100 would not be damaged due to excessively higher temperature, thereby prolonging a service life of the street lamp holder 100. In this example, the accommodation cavity 14, the first sealing groove 11 and the second sealing groove 12 are all formed by inwardly depressing from an outer surface of the housing 1 at a side away from the heat dissipation assembly 13; the light source 3 is accommodated in the accommodation cavity 14 and is fixedly mounted with the housing 1 at a bottom of the accommodation cavity 14, and the sealing member 2 is limited and accommodated in the first sealing groove 11.

Specifically, the first sealing groove 11 surrounds an outer side of the light source 3, the second sealing groove 12 is located between the light source 3 and the first sealing groove 11, and the second sealing groove 12 is formed by at least two annular grooves 121 communicated with each other; the light source 3 is arranged in and surrounded by each of the at least two annular grooves 121. That is to say, the annular groove 121 passes through the middle of the light source 3 to divide the light source 3 and surround the light source 3, so that the light source 3 can be sealed during assembling. In the present disclosure, by providing the first sealing groove 11 and the second sealing groove 12 on the housing 1, the multi-functionalization of the housing 1 can be realized to meet the needs of multiple customizations.

The light source 3 is composed of at least two LED lamp boards 31 to be matched with the number of the annular grooves 121, so that a periphery of each LED lamp board 31 is wrapped by the annular groove 121 to ensure the sealing effect. The bottom of the housing 1 is located between two adjacent LED lamp boards 31, and is provided with a rib 122, which separates two adjacent LED lamp boards 31 and also separates two adjacent annular grooves 121. In addition, notches 123 are also provided at both ends of the rib 122, and the notches 123 are used to connect two adjacent annular grooves 121, so as to realize the communication among a plurality of annular grooves 121 and finally form a complete second sealing groove 12.

Further, the light source 3 in the present disclosure is composed of three LED lamp boards 31, the three LED lamp boards 31 are evenly distributed in the accommodation cavity 14 and have the same size and the same shape, which is a rectangular shape. Of course, in some other examples, the number, size and shape of the LED lamp boards 31 can be adjusted according to actual conditions, which is not limited here.

The housing 1 is also provided with four fixing holes 15 and several mounting holes 16; the four fixing holes 15 are distributed in pairs on two long sides of the housing 1, and the mounting holes 16 are provided on ribs 122 and are evenly distributed along the direction of the short sides of the housing 1. Preferably, each rib 122 is provided with two mounting holes 16, and each notch 123 is also correspondingly provided with a mounting hole 16; of course, in some other examples, both the number and positions of the fixing holes 15 and the mounting holes 16 as arrangement can be set according to actual situations, which is not limited here.

In this example, the fixing holes 15 are arranged between the second sealing groove 12 and the light source 3; specifically, the fixing holes 15 are arranged on the LED lamp boards 31 located at both ends of the light source 3, and are located at the middle positions of the short sides of the LED lamp boards 31. Of course, in some other examples, both the number and positions of the fixing holes 15 can be set according to actual situations, which is not limited here.

Figure 4:
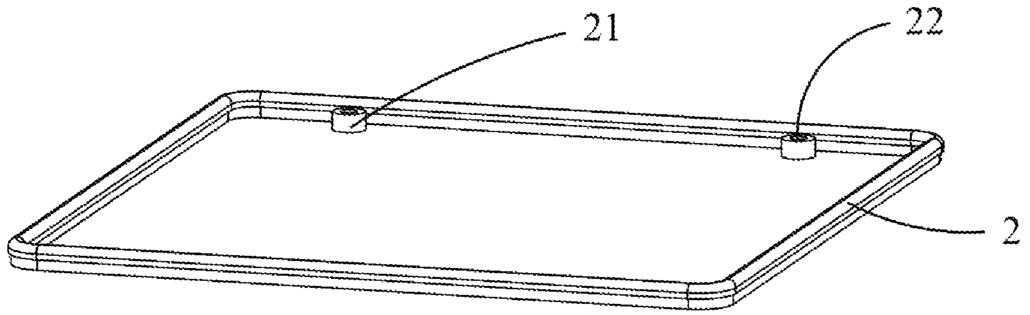
FIG. 4 is a schematic structural diagram of a sealing member in FIG. 1.
Figure 5:
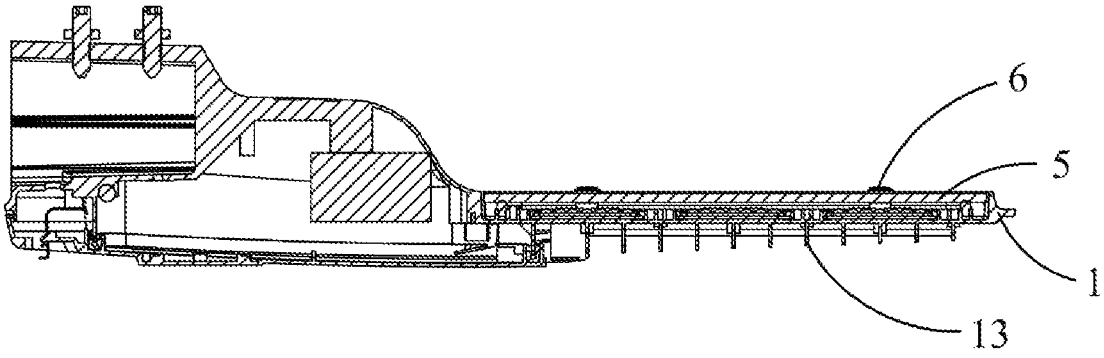
FIG. 5 is a cross-sectional view of the street lamp holder in FIG. 1.
Figure 6:
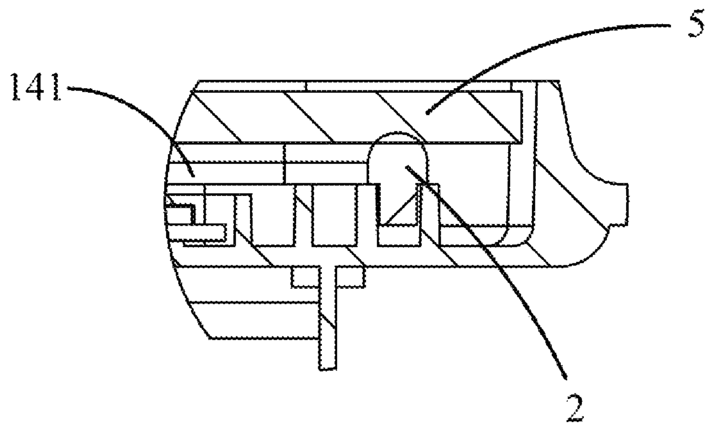
FIG. 6 is a partially enlarged view of a sealed connection in FIG. 5.

As shown in FIG. 4 and FIG. 6, the sealing member 2 is arranged in an annular shape and is matched with the first sealing groove 11 in both shape and size. Of course, a top portion of the sealing member 2 can also be protruded beyond the first sealing groove 11. When the sealing member 2 is limited and accommodated in the first sealing groove 11, a sealing cavity 141 can be formed between the accommodation cavity 14 and the housing 1 to completely seal the street lamp holder 100 and realize waterproof and dustproof effect of the street lamp holder 100 as a whole. The sealing member 2 is provided with bumps 21, which extend from the sealing member 2 towards the light source 3 and are arranged in a circular shape; the number and the positions of the bumps 21 correspond to the number and the positions of the fixing holes 15. The bump 21 is provided with a through hole 22, so that the connecting member 6 can be used to pass through the through hole 22 to be connected with the fixing hole 15 to achieve a fixed connection between the sealing member 2 and the housing 1.

The optical module 4 includes lenses, and the lenses 4 are arranged to cover an outer side of the light source 3 so that light emitted by the light source 3 can be emitted to the outside. For the convenience of description, each lens 4 is divided into two parts, i.e., lens pieces 41 and a base board 42, which will be explained in details below. The lens pieces 41 are integrally formed with the base board 42; the lens pieces 41 are formed on the base board 42 and are protruded outwards from the base board 42. Generally, the lens piece 41 is transparent, and the shape of the lens piece 41 can be one or more of a circular shape, an elliptical shape, a dumbbell-like shape and a crescent shape. The lens pieces 41 can be arranged on the base board 42 in an array, in a staggered manner or in a centrally symmetrical manner. Of course, in some other examples, the shape and the arrangement of the lens pieces 41 can be adjusted according to actual conditions, which is not limited here.

In this example, at least two optical modules 4 are provided, and the at least two optical modules 4 correspond to the at least two annular grooves 121; of course, the shapes and arrangements of the lens pieces 41 on the at least two optical modules 4 can be the same or different, depending on actual situations.

The glass 5 is arranged in a rectangular shape to be matched with the shape of the first sealing groove 11, but the size of the glass 5 is larger than the size of the first sealing groove 11, so that the glass 5 can cover the first sealing groove 11 completely; in this case, the sealing cavity 141 is formed between the accommodation cavity 14 and the glass 5. The glass 5 is provided with connecting holes 51 corresponding to the fixing holes 15, so that when the glass 5 is assembled, the connecting members 6 can be used to pass through the connecting holes 51 to be locked and fixed with the fixing holes 15, thereby achieving a fixed connection between the glass 5 and the housing 1. Preferably, the connecting members 6 are screws, and the fixing holes 15 are screw holes, but the present disclosure should not be limited thereto.

When assembling, firstly, the sealing member 2 is placed into the first sealing groove 11, with the through holes 22 on the sealing member 2 being corresponding to the fixing holes 15 at the bottom of the housing 1, and then the glass 5 is pressed onto the housing 1, so that the sealing member 2 is squeezed and deformed; finally, the connecting members 6 are caused to pass through the connecting holes 51 on the glass 5 and the through holes 22 on the sealing member 2 in sequence, until the connecting members 6 are locked and fixed with the fixing holes 15 at the bottom of the housing 1; in this way, the sealed connection between the glass 5 and the housing 1 can be realized, and the light source 3 is arranged in the sealing cavity 141 formed and surrounded by the glass 5 and the housing 1, thereby realizing the waterproof and dustproof effect of the street lamp holder 100.

As shown in FIGS. 7 to 11, it is the second example of the street lamp holder 100' of the present disclosure. The structure of the street lamp holder 100' in the second example is substantially the same as the structure of the street lamp holder 100 in the first example, with the difference merely in that the glass is omitted, and the structure of the optical module is modified to be matched with the second sealing groove 12. The following part of the description will not describe the same structure any more, but mainly describe the differences in details.

In the second example, the optical module 4' includes a substrate 43 and lenses 4 located on the substrate 43, and the lenses 4 cover the outer side of the light source 3. The shape and arrangement of the lenses 4 are the same as those in the first example, which is not repeated herein. The substrate 43 is provided with perforations 431 corresponding to the mounting holes 16, so that the connecting members 6 can be used to pass through the perforations 431 to be locked and fixed with the mounting holes 16, thereby achieving a locked connection between the optical module 4' and the housing 1. Preferably, at least two optical modules 4' are provided and correspond to at least two annular grooves 121, side edges of substrates 43 of two adjacent optical modules 4' overlap with each other, and the perforations 431 on the two overlapped substrates 43 correspond to each other, so that the connecting members 6 can be used to pass through the perforations 431 on both of the two substrates 43 at the same time to be connected with the mounting holes 16, thereby realizing a fixed connection between the two adjacent optical modules 4'.

The sealant 2' is liquid sealant, the sealant 2' can fully fill the second sealing groove 12 and can connect the optical module 4' with the housing 1 in a sealed manner after curing, and a sealing cavity 141' is formed between the accommodation cavity 14 and the optical module 4', so that the light source 3 is sealed in the sealing cavity 141', and the waterproof and dustproof effect of the light source 3 is achieved. Of course, in some other examples, the sealing member 2' can also be a solid sealing ring; in this case, the size of the sealing ring needs to be matched with the size of the second sealing groove 12, so that the sealing ring can be clamped in the second sealing groove 12 to achieve the waterproof and dustproof effect of the street lamp holder 100'.

When assembling, the sealant 2' is injected into the second sealing groove 12 by an automatic gluing device, then the optical module 4' is pressed onto the housing 1, and the connecting members 6 are caused to pass through the perforations 431 to be fixedly locked with the mounting holes 16, so that a sealed connection between the optical module 4' and the housing 1 can be realized after the sealant 2' is cured in the second sealing groove 12, thereby further achieving the waterproof and dustproof effect of the street lamp holder 100'.

Figure 7:
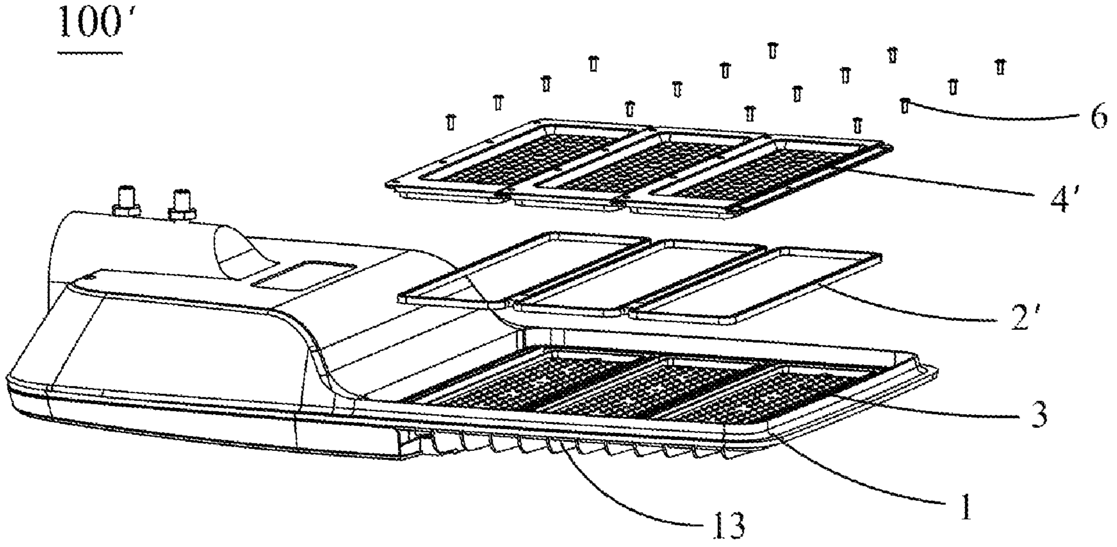
FIG. 7 is an exploded view of a street lamp holder according to a second example of the present disclosure.
Figure 8:
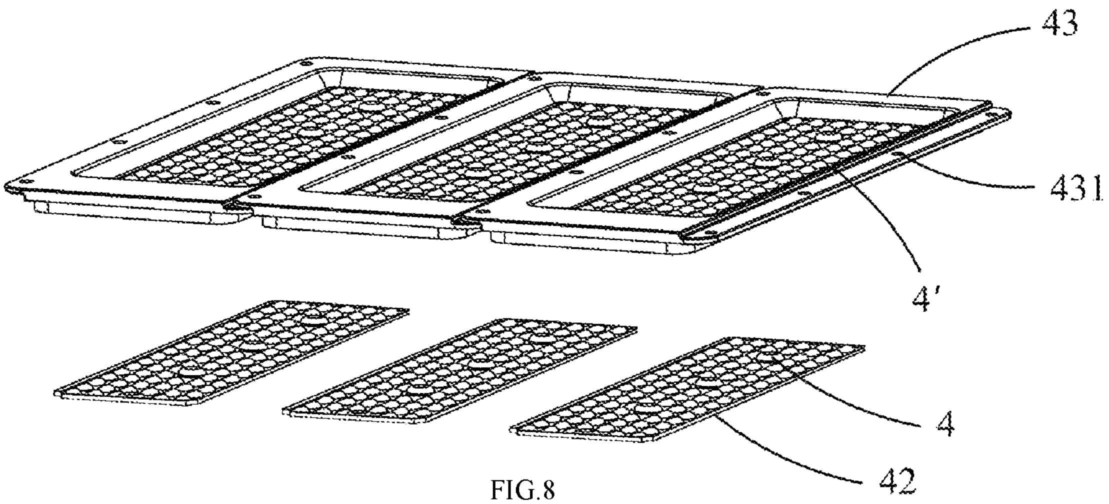
FIG. 8 is an exploded view of an optical module in FIG. 7.
Figure 9:
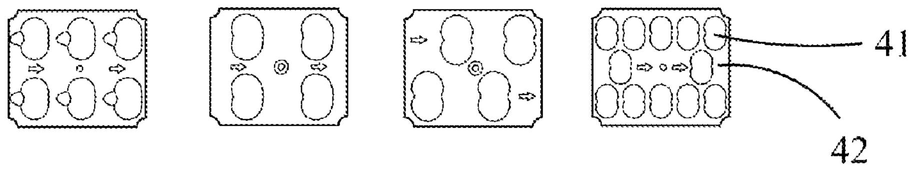
FIG. 9 is a schematic diagram illustrating various arrangements of lenses in FIG. 8.
Figure 10:
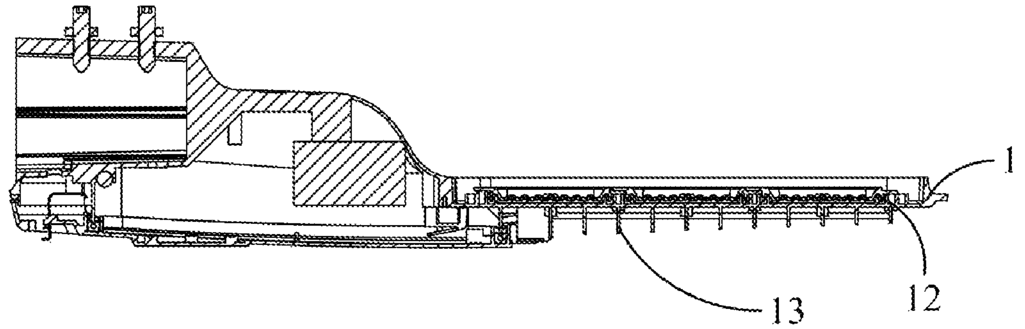
FIG. 10 is a cross-sectional view of the street lamp holder in FIG. 7.
Figure 11:
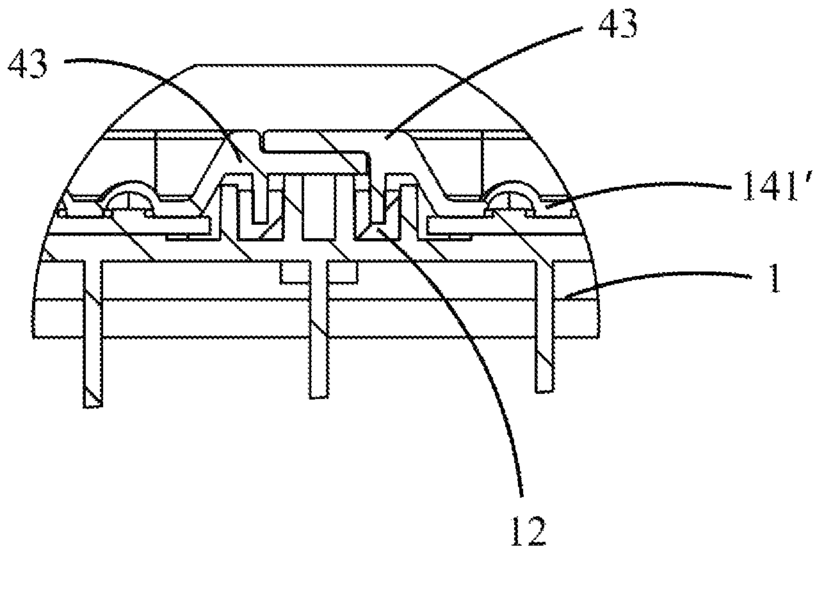
FIG. 11 is a partially enlarged view of a sealed connection in FIG. 10.
Figure 12:
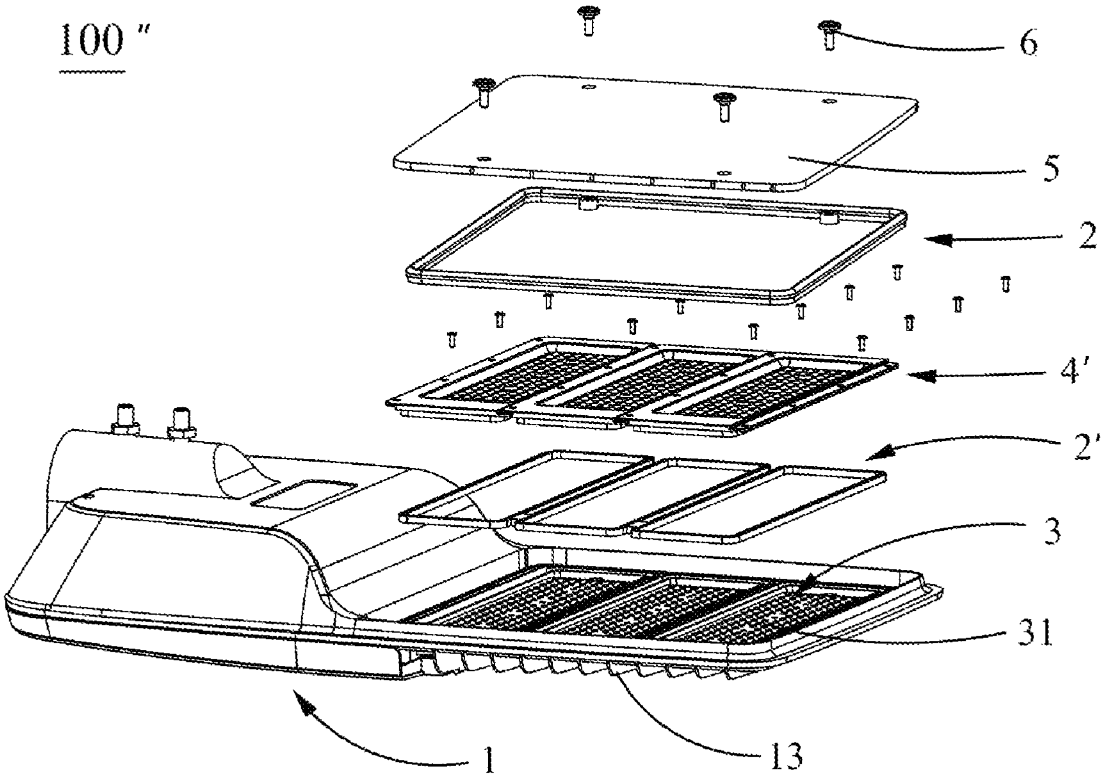
FIG. 12 is an exploded view of a street lamp holder according to a third example of the present disclosure.

As shown in FIG. 12, it is the third example of the street lamp holder 100" of the present disclosure, which is a combination of the first example as shown in FIG. 1 with the second example as shown in FIG. 7; that is, in the third example, the street lamp holder 100" includes the housing 1, the light source 3, the glass 5, the sealing member 2, the sealing member 2', and the optical module 4', with the purpose of further increasing the sealing effect of the street lamp holder 100".

When assembling, the sealant 2' is injected into the second sealing groove 12 by an automatic gluing device, then the optical module 4' is pressed onto the housing 1, and the connecting members 6 are caused to pass through the perforations 431 to be fixedly locked with the mounting holes 16, so that a sealed connection between the optical module 4' and the housing 1 can be achieved after the sealant 2' is cured in the second sealing groove 12. Subsequently, the sealing member 2 is placed in the first sealing groove 11, with the through holes 22 being corresponding to the fixing holes 15; then the glass 5 is pressed onto the housing 1, with the connecting holes 51 being corresponding to the through holes 22 and the fixing holes 15; and then the connecting members 6 are caused to pass through the connecting holes 51 and the through holes 22 sequentially to be fixedly locked and connected with the fixing holes 15; in this case, under a mutual compression between the glass 5 and the housing 1, the sealing member 2 is squeezed and deformed to realize a sealed connection between the glass 5 and the housing 1. That is to say, the sealant 2' and the second sealing groove 12 form a first layer of sealing structure, and the sealing member 2 and the first sealing groove 11 form a second layer of sealing structure. Such a double-layered sealing structure further improves the waterproof and dustproof effect of the street lamp holder 100".

To sum up, in the street lamp holders 100, 100', 100" of the present disclosure, the first sealing groove 11 and the second sealing groove 12 are provided on the housing 1, so that a corresponding sealing groove and a corresponding optical module can be selected depending on different application requirements, which not only can reduce development costs of products but also can satisfy application requirements under multiple situations. At the same time, the lenses 4 are designed to have various shapes and different arrangements, which further increases the product capacity of the street lamp holders 100, 100', 100".

The objective of the present disclosure is to provide a street lamp holder, which not only has low development cost, but also has strong expansibility.

In order to achieve the above objective, the present disclosure provides a street lamp holder, including: a housing, wherein an accommodation cavity, a first sealing groove arranged around the accommodation cavity, and a second sealing groove located in the accommodation cavity are internally formed in the housing; a light source, wherein the light source is accommodated in the accommodation cavity; an optical module, wherein the optical module is also accommodated in the accommodation cavity and covers an outer side of the light source; and a sealing member, wherein the sealing member is limited and accommodated in the first sealing groove and/or the second sealing groove; the first sealing groove is arranged around the outer side of the light source, and in a case that the sealing member is limited and accommodated in the first sealing groove, a sealing cavity is formed between the accommodation cavity and the housing; the second sealing groove is located between the light source and the first sealing groove, and in a case that the sealing member is limited and accommodated in the second sealing groove, the sealing cavity is formed between the accommodation cavity and the optical module.

As a further improvement of the present disclosure, the optical module includes a lens, the street lamp holder further includes a glass and a connecting member, the lens covers the outer side of the light source, the sealing member is accommodated in the first scaling groove, and the glass is in contact with the housing through the sealing member and is locked and fixed with the housing through the connecting member so that the sealing cavity is formed between the accommodation cavity and the glass.

As a further improvement of the present disclosure, the housing is provided with a fixing hole, and both the sealing member and the glass are provided with a through hole corresponding to the fixing hole, and the connecting member passes through the through hole to be locked and fixed with the fixing hole.

As a further improvement of the present disclosure, the sealing member is provided with a bump, and the through hole is arranged on the bump.

As a further improvement of the present disclosure, the optical module includes a substrate and a lens located on the substrate, the street lamp holder further includes a connecting member, the lens covers the outer side of the light source, the sealing member is accommodated in the second sealing groove, and the optical module is in contact with the housing through the sealing member and is locked and fixed with the housing through the connecting member.

As a further improvement of the present disclosure, the housing is provided with a mounting hole, the substrate is provided with a perforation corresponding to the mounting hole, and the connecting member passes through the perforation to be locked and fixed with the mounting hole.

As a further improvement of the present disclosure, the sealing member is a sealant, the second sealing groove is formed by at least two annular grooves communicated with each other, the light source is provided in and surrounded by each of the at least two annular grooves, and the sealant fully fills the second sealing groove to connect the optical module and the housing in a sealed manner upon the sealant being cured.

As a further improvement of the present disclosure, at least two optical modules are provided and correspond to the at least two annular grooves, side edges of substrates of two adjacent optical modules overlap with each other so that the connecting member passes through the perforations on both of two substrates to fixedly connect the two adjacent optical modules.

As a further improvement of the present disclosure, the street lamp holder further includes a glass and a connecting member, wherein the sealing member is provided in each of the first sealing groove and the second sealing groove, and the optical module is in contact with the housing through the sealing member in the second sealing groove and is fixedly connected to the housing through the connecting member; the glass is in contact with the housing through the sealing member in the first sealing groove and is fixedly connected to the housing through the connecting member.

As a further improvement of the present disclosure, the optical module includes lenses, and a shape of the lens includes one or more of a circular shape, an elliptical shape, a dumbbell-like shape and a crescent shape; and the lenses are arranged in an array, arranged in a staggered manner or arranged in a centrally symmetrical manner.

The beneficial effects of the present disclosure are as follows: the street lamp holder of the present disclosure is provided with the first sealing groove and the second sealing groove on the housing, so that a corresponding sealing groove and a corresponding optical module can be selected depending on different application requirements, which not only can reduce development costs of products but also can satisfy application requirements under multiple situations.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples are only used to illustrate the technical solutions of the present disclosure instead of constituting any limitation thereto. Although the present disclosure has been described in details with reference to the examples, one of ordinary skilled in the art should understand that the technical solutions of the present disclosure can be modified or equivalently replaced without departing from the spirit and scope of the technical solutions of the present disclosure.

What is claimed is:

1. A street lamp holder, comprising:

a housing, wherein an accommodation cavity, a first sealing groove arranged around the accommodation cavity, and a second sealing groove located in the accommodation cavity are internally formed in the housing;

a light source, wherein the light source is accommodated in the accommodation cavity;

an optical module, wherein the optical module is also accommodated in the accommodation cavity and covers an outer side of the light source; and a sealing member, wherein the sealing member is limited and accommodated in the first sealing groove and the second sealing groove; the first sealing groove is arranged around the outer side of the light source, and in a case that the sealing member is limited and accommodated in the first sealing groove, a sealing cavity is formed between the accommodation cavity and the housing; the second sealing groove is located between the light source and the first sealing groove, and in a case that the sealing member is limited and accommodated in the second sealing groove, the sealing cavity is formed between the accommodation cavity and the optical module.

2. The street lamp holder according to claim 1, wherein:

the optical module comprises a lens, and the street lamp holder further comprises a glass and a connecting member, and the lens covers the outer side of the light source, the sealing member is accommodated in the first sealing groove, and the glass is in contact with the housing through the sealing member and is locked and fixed with the housing through the connecting member so that the sealing cavity is formed between the accommodation cavity and the glass.

3. The street lamp holder according to claim 2, wherein the housing is provided with a fixing hole, and both the sealing member and the glass are provided with a through hole corresponding to the fixing hole, and the connecting member passes through the through hole to be locked and fixed with the fixing hole.

4. The street lamp holder according to claim 3, wherein the sealing member is provided with a bump, and the through hole is arranged on the bump.

5. The street lamp holder according to claim 1, wherein the optical module comprises a substrate and a lens located on the substrate, and the street lamp holder further comprises a connecting member, the lens covers the outer side of the light source, the sealing member is accommodated in the second sealing groove, and the optical module is in contact with the housing through the sealing member and is locked and fixed with the housing through the connecting member.

6. The street lamp holder according to claim 5, wherein the housing is provided with a mounting hole, the substrate is provided with a perforation corresponding to the mounting hole, and the connecting member passes through the perforation to be locked and fixed with the mounting hole.

7. The street lamp holder according to claim 6, wherein the sealing member is a sealant, the second sealing groove is formed by at least two annular grooves communicated with each other, the light source is provided in and surrounded by each of the at least two annular grooves, and the sealant fully fills the second sealing groove to connect the optical module and the housing in a sealed manner upon the sealant being cured.

8. The street lamp holder according to claim 7, wherein at least two optical modules are provided and correspond to the at least two annular grooves, side edges of two substrates of two wo adjacent optical modules overlap with each other so that the connecting member passes through the perforations on both of the two substrates to fixedly connect the two adjacent optical modules.

9. The street lamp holder according to claim 1, further comprising:

a glass and a connecting member, wherein the sealing member is provided in each of the first sealing groove and the second sealing groove, and the optical module is in contact with the housing through the sealing member in the second sealing groove and is fixedly connected to the housing through the connecting member; the glass is in contact with the housing through the sealing member in the first sealing groove and is fixedly connected to the housing through the connecting member.

10. The street lamp holder according to claim 1, wherein:

the optical module comprises lenses, and a shape of the lens comprises one or more of a circular shape, an elliptical shape, a dumbbell-like shape and a crescent shape, and the lenses are arranged in an array, arranged in a staggered manner or arranged in a centrally symmetrical manner.

* * * * *